(12) United States Patent
Giefer et al.

(10) Patent No.: US 7,137,313 B2
(45) Date of Patent: Nov. 21, 2006

(54) SHIFTING DEVICE FOR TRANSMITTING SHIFT COMMANDS TO AN AUTOMATIC TRANSMISSION

(75) Inventors: Andreas Giefer, Lemförde (DE); Jörg Meyer, Wagenfeld (DE)

(73) Assignee: ZF Lemföfder Metallwaren AG (DE)

( * ) Notice: Subject to any disclaimer, the term of this patent is extended or adjusted under 35 U.S.C. 154(b) by 0 days.

(21) Appl. No.: 11/060,676

(22) Filed: Feb. 17, 2005

(65) Prior Publication Data

US 2005/0139031 A1    Jun. 30, 2005

Related U.S. Application Data

(63) Continuation of application No. PCT/DE03/03656, filed on Nov. 3, 2003.

(30) Foreign Application Priority Data

Nov. 6, 2002    (DE) ................ 102 52 009

(51) Int. Cl.
*B60K 17/04*    (2006.01)
(52) U.S. Cl. .................... 74/473.12; 74/335
(58) Field of Classification Search ........... 74/473.1, 74/473.12, 335, 500.5, 519
See application file for complete search history.

(56) References Cited

U.S. PATENT DOCUMENTS

| 4,987,792 | A | * | 1/1991 | Mueller et al. ......... 74/473.12 |
| 5,622,079 | A |   | 4/1997 | Woeste et al. |
| 5,660,080 | A | * | 8/1997 | Rector et al. ............ 74/473.12 |
| 5,852,953 | A | * | 12/1998 | Ersoy ....................... 74/473.12 |
| 6,386,061 | B1 |   | 5/2002 | Giefer |
| 6,904,823 | B1 | * | 6/2005 | Levin et al. ........... 74/471 XY |
| 2001/0004851 | A1 |   | 6/2001 | Kim |
| 2005/0139031 | A1 | * | 6/2005 | Giefer et al. ............ 74/473.15 |

FOREIGN PATENT DOCUMENTS

| DE | 44 26 207 | 8/1995 |
| DE | 198 53 934 | 5/2000 |
| DE | 102 22 671 | 12/2003 |
| FR | 2 797 229 | 2/2001 |
| WO | WO 00/30885 | 6/2000 |

* cited by examiner

*Primary Examiner*—David M. Fenstermacher
(74) *Attorney, Agent, or Firm*—McGlew & Tuttle, PC

(57) ABSTRACT

A shifting device for transmitting shift commands to an automatic transmission of a motor vehicle includes a housing (1) and/or a frame and a gearshift lever (2), which is designed such that it is pivotable around a selector axis and a shift axis. The selector axis and the shift axis are preferably arranged at right angles in relation to one another, and the gearshift lever (2) can be shifted at least into a first shift gate and a second shift gate. The first shift gate preferably shifts shifting programs (P, N, R and D) of an automatic transmission and the second shift gate preferably implements manual tapping commands. A shifting carriage (3) is provided, which is mounted linearly movably in a plane and is designed such that the movement of the gearshift lever (2) in the first shift gate brings about a linear displacement of the shifting carriage due to a force coupling, and uncoupling of the movement of the gearshift lever (2) from the shifting carriage (3) is brought about by a movement of the gearshift lever (2) in the second shift gate.

26 Claims, 5 Drawing Sheets

SHIFTING DEVICE FOR TRANSMITTING SHIFT COMMANDS TO AN AUTOMATIC TRANSMISSION

CROSS REFERENCE TO RELATED APPLICATION

This is a continuation of and claims the benefit (35 U.S.C. § 120 and 365(c)) of copending International Application PCT/DE 2003/03656 of Nov. 3, 2003, which designated inter alia the United States and which claims the priority of German Application DE 102 52 009.7 of Nov. 6, 2002. The entire contents of each application is hereby incorporated by reference in its entirety.

FIELD OF THE INVENTION

The present invention pertains to a shifting device for transmitting shift commands to an automatic transmission of a motor vehicle with a housing and/or a frame, a gearshift lever, which is designed such that it is pivotable around a selector axis and a shift axis, wherein the selector axis and the shift axis are preferably arranged at right angles to one another, and the gearshift lever can be shifted at least into a first shift gate and a second shift gate, wherein the first shift gate preferably shifts shifting programs (P, N, R and D) of an automatic transmission and the second shift gate preferably implements manual tapping commands.

BACKGROUND OF THE INVENTION

A similar shifting device is known from the Applicant's patent application DE 198 53 934 A1. This shifting device already has two shift gates, wherein the first one, also called automatic shift gate, is intended for selecting automatic transmission gears and the second, designated as sequence shift gate, is intended for the manual upshifting and downshifting of transmission gears. Furthermore, this shifting device has a selection gate, which is used to change over between the automatic shift gate and the sequence shift gate. A simple review of the shift positions is shown in FIG. 13a of that document, where the sequence shift gate is abbreviated as SG1, the automatic shift gate as AG and the selection gate as WG1.

A complicated mechanism is necessary to make it possible to change over between the automatic shift gate and the sequence shift gate and to mechanically implement the shift commands in the particular gates. FIG. 18 shows the shifting mechanism. The shift commands are implemented, for example, by means of a cable, by means of the gearshift lever, which is designed as a gearshift lever pivotable in relation to the selector axis and the shift axes.

One problem occurring in the prior-art shifting device for automatic transmissions with an additional sequence shift gate (tapping gate) is that the movements of the gearshift lever are transmitted by the driver to the transmission via a second lever or cable lever by means of a cable. If the driver changes over from the automatic shift gate, which shifts the programs of the automatic transmission, into the sequence shift gate (tapping gate), the gearshift lever is mechanically separated from the cable in order to prevent a cable movement from occurring during the tapping movement. A complicated mechanism, which requires much space for its installation, is needed to embody this shifting mechanism. In addition, expensive components must be used because of the possibility of strong forces of abuse.

Another problem of the prior-art shifting device for automatic transmissions with an additional manual gate (tapping gate) is that the kinematics is especially "tight" during the shifting operation, i.e., requires much force and is consequently uncomfortable because of the complicated mechanism.

SUMMARY OF THE INVENTION

The object of the present invention is therefore to make available a shifting device for automatic transmissions with an additional gate (tapping gate) for transmitting shift commands to an automatic transmission of a motor vehicle, which has a substantially simpler design than the prior-art shifting devices and can therefore be manufactured at a lower cost. Such a shifting device should at the same time offer improved shifting comfort despite a simpler design.

According to the invention a shifting device for transmitting shift commands to an automatic transmission of a motor vehicle be equipped with a housing and/or a frame as well as a gearshift lever, wherein the gearshift lever is designed as a gearshift lever pivotable around a selector axis and a shift axis, the selector axis and the shift axis being preferably arranged at right angles to one another, and the gearshift lever being able to be shifted at least into a first shift gate and a second shift gate. Shifting programs (P, N, R and D) of an automatic transmission can be preferably shifted in the first shift gate and manual tapping commands can be preferably shifted in the second shift gate. A shifting carriage is provided, which is mounted linearly movably in a plane and is designed such that a linear displacement of the shifting carriage is made possible by moving the gearshift lever into the first shift gate and uncoupling of the movement of the shifting carriage is brought about by moving the gearshift lever into the second shift gate.

A simple design of the shifting device is achieved as a result, whereby the space needed for the installation of the new shifting device will be very compact. In addition, the kinematics can be designed such because of the uncomplicated mechanism that it will be especially "smooth running," i.e., will require only weak forces and will consequently be especially comfortable.

To make it possible to shift the shifting programs (P, N, R and D) of the automatic transmission in the first shift gate, there should be a coupling between the shifting carriage and the automatic transmission. Such a coupling can be embodied in various ways.

For example, at least partially mechanical elements may be arranged between the shifting carriage and the automatic transmission for transmitting the forces of the hand, which shift shifting programs in the automatic transmission (P, N, R and D). For example, a simple cable, a bowden cable or even a mechanical linkage is suitable for this.

Another design of the coupling can be embodied at least partially by electric elements. Thus, the shift position of the shifting carriage can be detected, for example, by means of Reed contacts, and the detected positions can be implemented by means of a motor operator, which shifts the positions of the transmission. As a result, the manual forces for shifting the automatic positions can be reduced or safety functions can be installed.

As an alternative, the coupling may also be embodied at least partially by optical elements. The position of the shifting carriage is detected optically and consequently in a contactless manner. The optical detector, which may be a distance laser, transmits the shifting programs to another shifting mechanism which will then shift the automatic transmission positions (P, N, R and D). The manual forces for shifting the automatic positions can be reduced in case of this design of the coupling as well.

Manual tapping commands, especially the selection of the gear in the manner of an individual gear selector such as the TIPTRONIC® brand selectors can be implemented in the second shift gate. To make it possible to upshift and downshift the gears, which options are designated mostly by "+" and "−," especially directly and rapidly, electric and/or optical switches should be used to implement the shift commands.

An extension of the gearshift lever beyond the fulcrum of the shift axes, which directly or indirectly engages the shifting carriage, is provided for the force coupling of the gearshift lever and the shifting carriage in a special embodiment of the shifting device. As a result, either the shift path of the gearshift lever or the force needed to actuate the gearshift lever in the selector axis and the shift axis can be varied in an especially simple manner by appropriately dimensioning the extension of the gearshift lever.

It is advantageous if a locking element, which is actuated by the movement of the gearshift lever in the selector axis and fixes the shifting carriage as soon as the gearshift lever is in the second shift gate, is provided to fix the shifting carriage. The shifting carriage is securely locked in the housing by this locking element, while the driver performs tapping commands for the TIPTRONIC® brand selector type shifting in the second shift gate. Such a locking element may be designed as a lever, which has a hook and engages recesses of the housing and/or of the frame.

Furthermore, the shifting device should have means for releasing the shifting carriage, which eliminates the force coupling between the shifting carriage and the gearshift lever as soon as the gearshift lever is in the second shift gate. This makes it possible to carry out additional shift commands with the now uncoupled gearshift lever.

Such a releasing means may be a release lever, which is mounted pivotably around an axis of the shifting carriage and displaceably around that axis and is interlocked with the shifting carriage in a first locked position and is displaceable in relation to the shifting carriage in a second position. For locking, the release lever may engage an elevation on the shifting carriage with a hook. For releasing, the release lever is pivoted, as a result of which the hook separates from the elevation on the shifting carriage and severs the connection between the shifting carriage and the gearshift lever. If the release lever is provided, for example, with an elongated hole in the area of the pivot axis, this elongated hole makes possible the displacement of the gearshift lever. The range of movement of the gearshift lever can be determined by the elongated holes. No force is transmitted to the shifting carriage within this range of movement.

In another advantageous embodiment of the shifting device, the shifting carriage is provided with openings. These openings are engaged by the gearshift lever, and the openings are designed such that a relative movement between the gearshift lever and the shifting carriage is possible in the second shift gate, and there is a force coupling of the movement between the gearshift lever and the shifting carriage in the first shift gate.

In an especially comfortable embodiment of the shifting device, the gearshift lever is guided directly or indirectly in a guide curve in order to determine the shifting programs (P, N, R and D) of the automatic transmission and to produce an ergonomic feeling of shifting. This guide curve can be designed such that a "bulge" is provided, for example, in the housing, for each shift position of a shifting program (P, N, R and D). A pin that is under spring force or a ball can be pressed into such a bulge. This generates a perceptible locking of the gearshift lever in each shift position, which also supports the precision of shifting.

To further improve the shifting comfort of the novel shifting device, it is advantageous to support the movement of the gearshift lever by a mount.

This mount may be designed as a ball and socket joint mount. Thus, a ball, which is guided in a complementary ball socket, may be arranged at the gearshift lever. The ball socket may be milled, for example, into the housing and surround the ball at least partially. A lubricant may be introduced between the ball and the ball socket in order to guarantee friction-optimized movement.

As an alternative to the mounting with a ball and socket joint mount, the gearshift lever may be mounted by means of two axes arranged crosswise.

It is especially favorable if the shifting device has a third shift gate, in which case the two outer shift gates are preferably symmetrical with the middle shift gate. Thus, for example, the shifting program of the automatic transmission can be shifted via the middle shift gate, and the two outer shift gates are available for implementing the tapping commands, for example, of a TIPTRONIC® brand selector type.

If the shifting device has this symmetrical design, the same shifting device can be used for vehicles that are designed as right-hand drive and left-hand drive vehicles. This is possible, for example, due to the fact that only the gear shifting gate, in which the gearshift lever moves, is adapted to the type of the vehicle.

Other features and advantages of the present invention appear from the following description of preferred exemplary embodiments with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
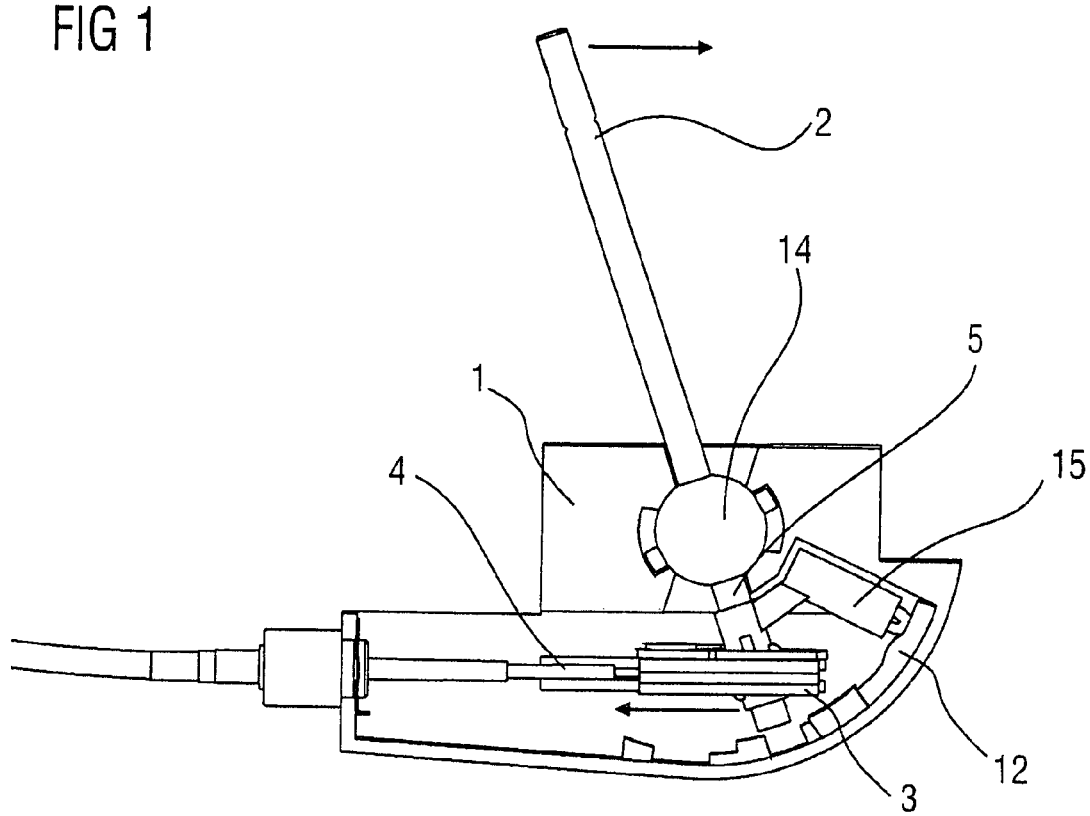
FIG. 1 is a side view of a first embodiment of a shifting device according to the invention, in which the gearshift lever is guided in the central guide curve.

FIG. 1 shows a side view of a first embodiment of the novel shifting device, in which the gearshift lever 2 is guided in the central guide curve 12. The gearshift lever 2 is mounted pivotably around two axes in a ball and socket joint mount 14 in one housing half 1. The gearshift lever 2 has an extension 5 under the ball and socket joint mount 14. This extension is coupled with the shifting carriage 3. The shifting carriage 3 has a connection with the automatic transmission of the motor vehicle via a cable 4. When the gearshift lever 2 is being moved to the right from the position shown in FIG. 1, the shifting carriage 3 is moved to the left. The different programs (P, N, R and D) of the automatic transmission are selected with the cable 4 by the movement of the shifting carriage 3. The movement of the gearshift lever 2 is guided during the selection of a certain automatic program with a guide element 15, which is fastened at the end of the gearshift lever 2 and engages a central guide curve 12.

Figure 2:
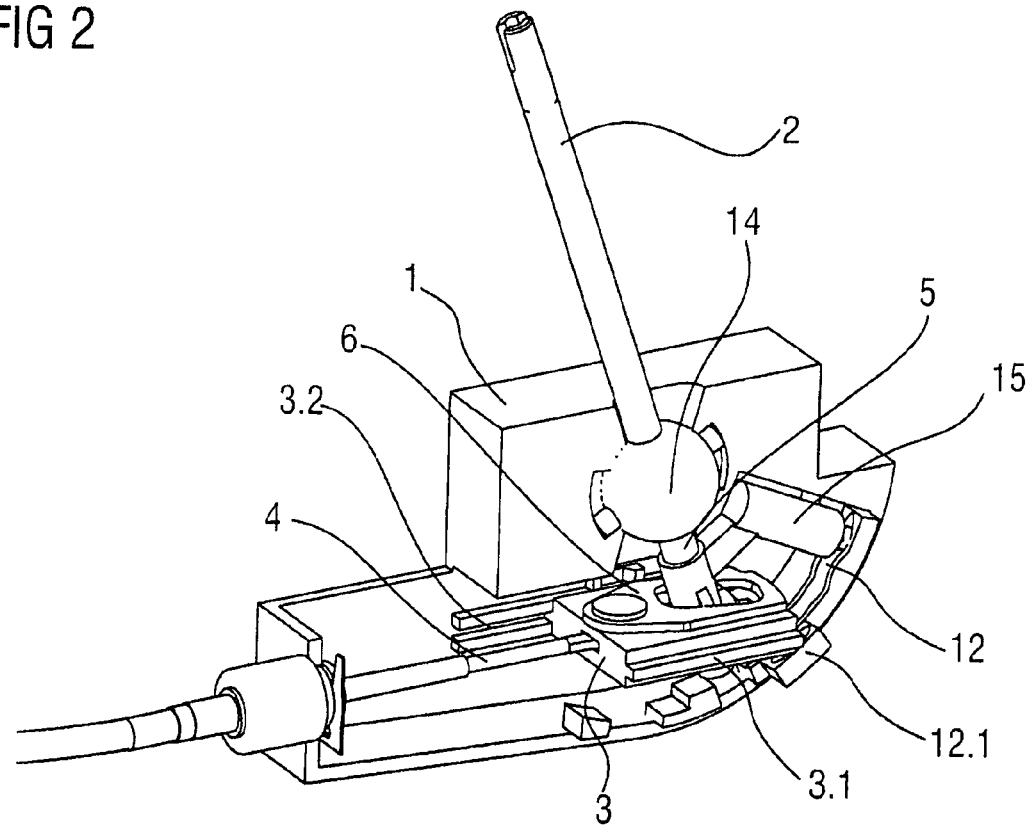
FIG. 2 is a 3D side view obliquely from the top of the shifting device according to FIG. 1.

FIG. 2 shows a 3D side view obliquely from the top of the shifting device according to FIG. 1. The shifting carriage 3 and its locking lever 6 can be recognized especially clearly in this view. The movement of the shifting carriage 3 is blocked by means of the locking lever 6, which can be pivoted by the movement of the gearshift lever 2. The shifting carriage 3, which is connected with the automatic transmission via a cable 4, moves over a linear path only. This movement of the shifting carriage 3 is guided on the linear path. Thus, guide lugs 3.1, which are guided in a guide groove 3.2 each in the housing halves 1, are arranged at the shifting carriage 3 to the right and left.

Figure 3:
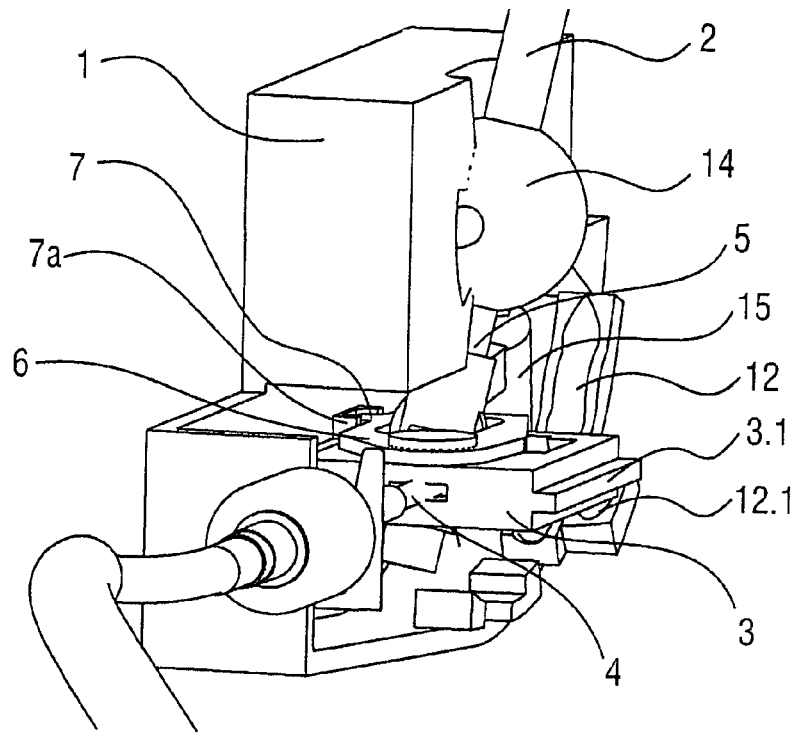
FIG. 3 is a 3D view obliquely from the front of the shifting device according to FIG. 2, where the gearshift lever is guided in the second lateral guide curve.
Figure 4:
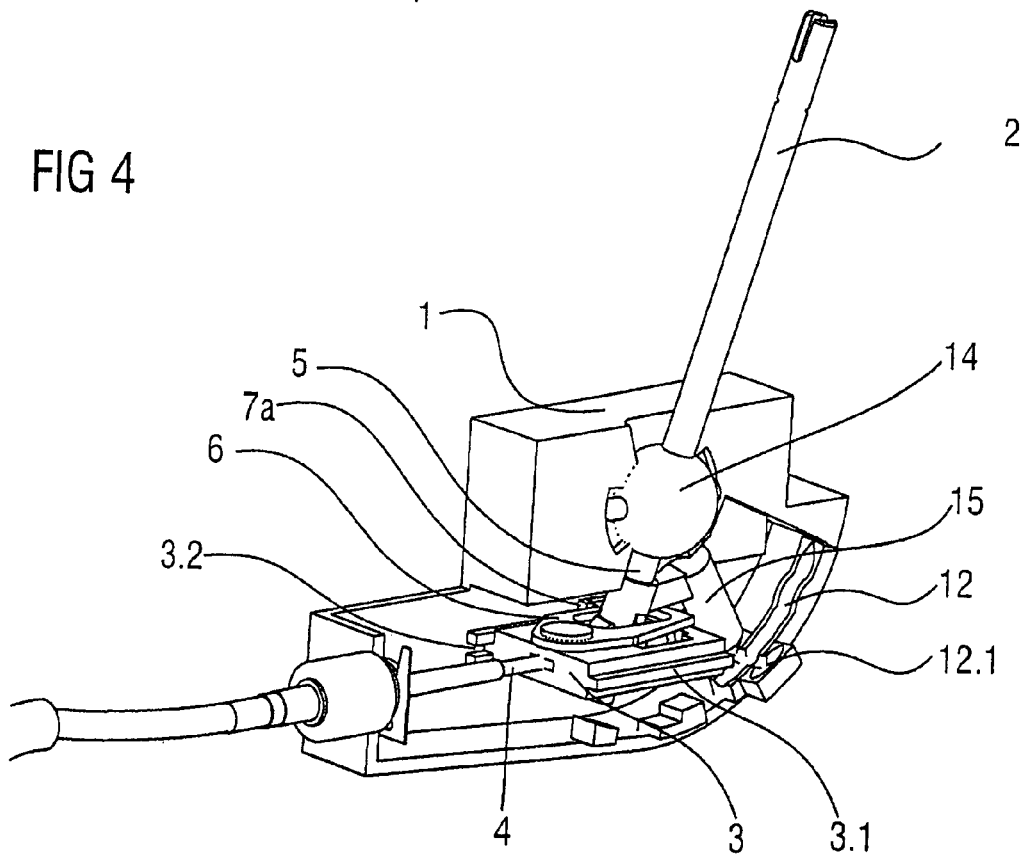
FIG. 4 is a 3D side view obliquely from the top of the shifting device according to FIG. 3.

FIGS. 3 and 4 show different perspective views of the shifting device. Contrary to FIGS. 1 and 2, the gearshift lever 2 is not in the first shift gate, in which the shifting programs (P, N, R and D) of an automatic transmission are shifted, but in the second shift gate, in which manual tapping commands can be implemented. The guide element 15 is no longer in the central guide curve 12, but it engages the second lateral guide curve 12.2 (not visible in FIGS. 3 and 4). In relation to this second lateral guide curve 12.2, a first lateral guide curve 12.1 is arranged in a mirror-inverted manner relative to the central guide curve 12. When the gearshift lever 2, the gearshift lever extension 5 and the guide element 15 are moved into this position, the locking lever 6, which is arranged at the shifting carriage 3, is pivoted. As a result, the hook 7 of the locking lever 6 snaps into a catch 7a provided for this purpose on the housing half 1, as a result of which the movement of the shifting carriage 3 is blocked in this position.

Figure 5:
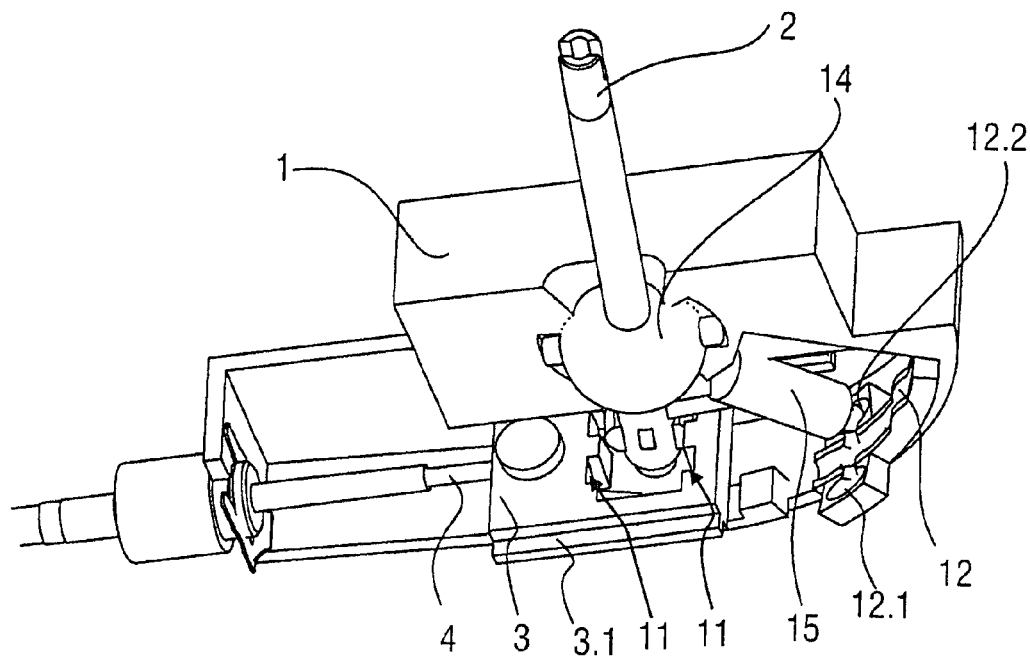
FIG. 5 is a 3D side obliquely from the top of the shifting device according to FIG. 4, but without a locking lever at the shifting carriage.

FIG. 5 shows another 3D side view obliquely from the top of the shifting device according to FIG. 4, but without the locking lever 6 at the shifting carriage 3. The shifting carriage 3 has four openings 10 in this area. If the gearshift lever 2 is in the shift gate that implements manual tapping commands, the extension 5 of the gearshift lever 2 can be moved to and fro between the openings 11, which may be elongated holes 10. The guide element 15 is guided for this purpose in the second lateral guide curve 12.2. If the gearshift lever 2 and the guide element 15 were moved into the position of the central guide curve 12, the gearshift lever 2 would be in contact with the shifting carriage 3 in the area of the narrowed sections of the shifting carriage 3. As a result, different programs of the automatic transmission could be selected by the movement of the gearshift lever 2 and of the shifting carriage 3 and consequently via the connected cable 4.

Figure 6:
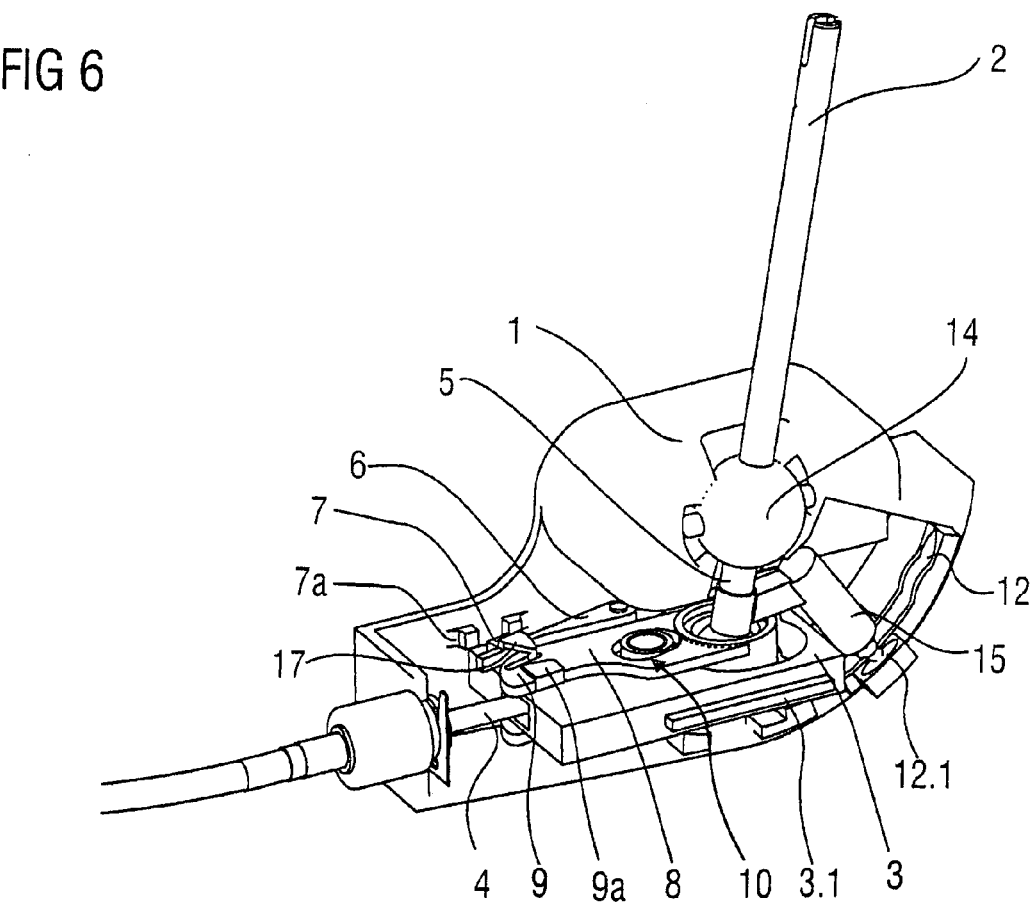
FIG. 6 is a 3D side view of a second embodiment of the shifting device according to the invention with the locking and release mechanism of the shifting carriage, wherein the movement of the shifting carriage is not blocked.
Figure 7:
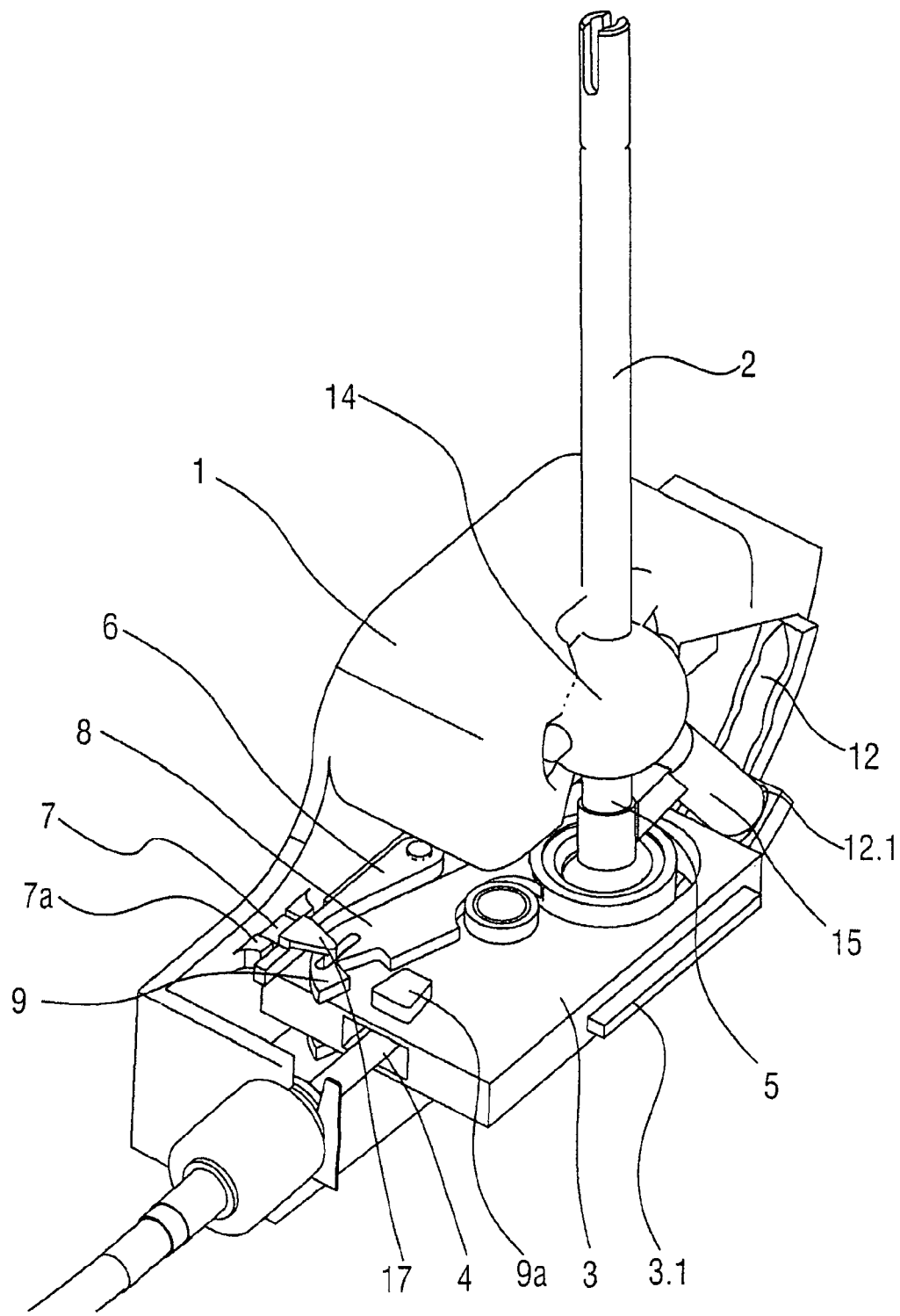
FIG. 7 is another 3D side view of the second embodiment of the shifting device according to FIG. 6, but with the shifting carriage blocked.

FIGS. 6 and 7 show perspective views of another embodiment of the novel shifting device with a special locking and release mechanism of the shifting carriage.

FIG. 6 shows a 3D side view of a second embodiment of the shifting device with the locking and release mechanism of the shifting carriage 3, wherein the movement of the shifting carriage 3 is not blocked. The locking mechanism and release mechanism shown comprises a locking lever 6 and a release lever 8, both of which are arranged at the shifting carriage 3. The locking lever 6 can engage a catch 7a on the housing half 1 with a hook 7 and thus block the linear movement of the shifting carriage 3. The release lever 8, which is connected at one end of the lever with the extension 5 of the gearshift lever and is optionally fastened at a catch 9a of the shifting carriage at the other end of the lever, can couple or uncouple the movement of the gearshift lever 2 with the shifting carriage 3. The movement of the locking lever 6 and of the release lever 8 are coupled with one another via a connection element 17. As is shown in FIG. 6, the gearshift lever 2 and the guide element 15 are located in the central guide curve 12. The locking lever 6 is open in this position, i.e., the hook 7 does not engage the catch 7a of the housing, as a result of which the shifting carriage 3 can move independently from the movement of the gearshift lever 2. At the same time, the release lever 8 is closed, i.e., the hook 9 engages the catch 9a of the shifting carriage 3, as a result of which the shifting carriage 3 is coupled with the gearshift lever 2. The different programs of the automatic transmission can be shifted in this position, and the movement of the gearshift lever 2 is transmitted to the automatic transmission via the shifting carriage and the cable 4.

FIG. 7 shows another 3D side view of the second embodiment of the shifting device according to FIG. 6. Contrary thereto, the guide element 15 of the gearshift lever 2 is in the first lateral guide curve 12.1. As a result, the position of the locking and release mechanism has changed. The locking lever 6 is closed in this position, i.e., the hook 7 engages the catch 7a of the housing half 1, as a result of which the movement of the shifting carriage 3 is blocked. At the same time, the release lever 8 is open, i.e., the hook 9 does not engage the catch 9a of the shifting carriage 3, as a result of which the shifting carriage 3 is uncoupled from the gearshift lever 2. The upward and downward shift movements of the transmission gears can be selected in this position of the gearshift lever 2.

Figure 8:
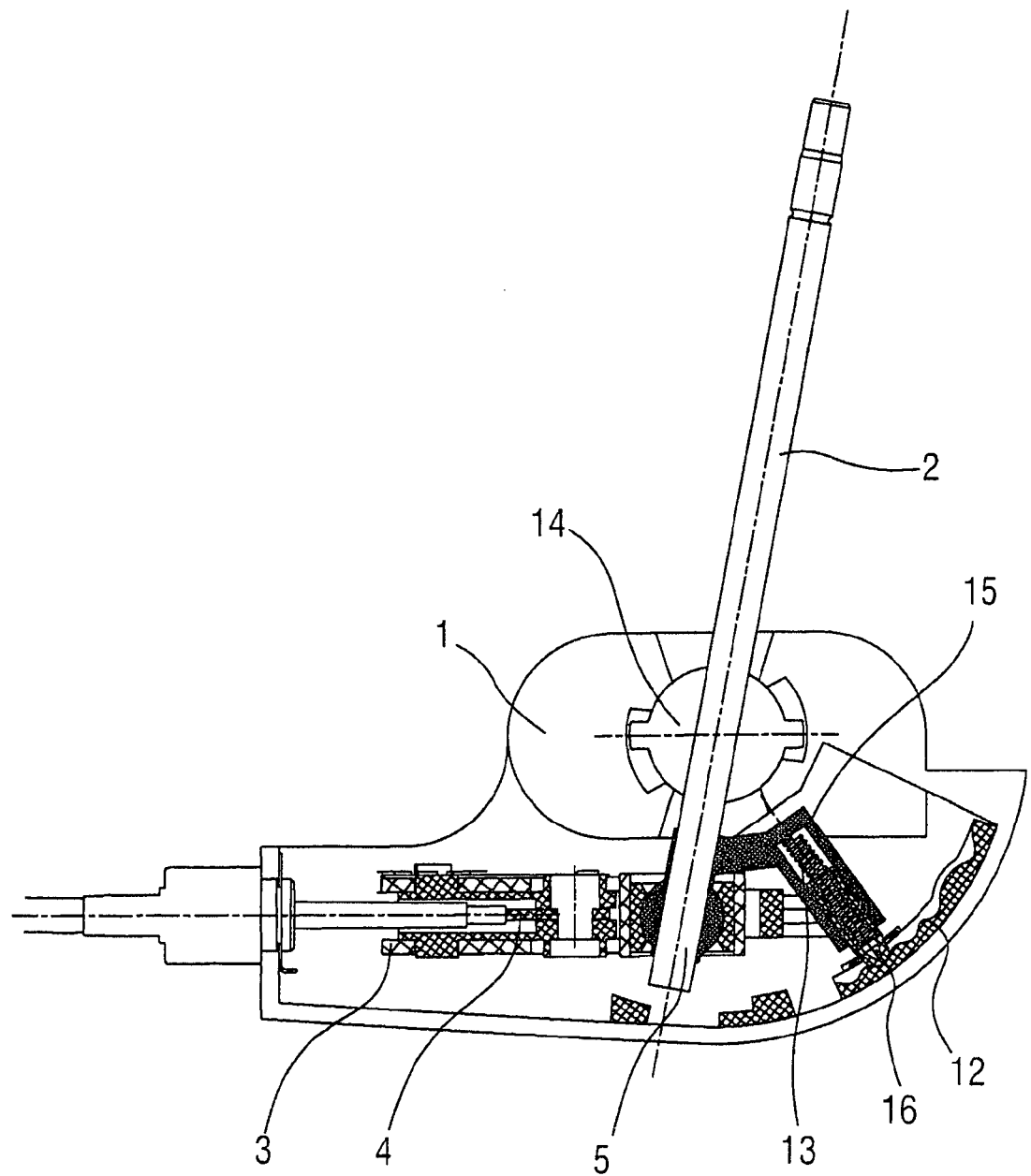
FIG. 8 is a side view through the shifting device according to FIG. 6.

FIG. 8 shows a section through the shifting device from FIG. 6. A gearshift lever 2 is mounted pivotably around two axes with a ball and socket joint mount 14 in a housing half 1. The gearshift lever 2 has an extension 5 under the ball and socket joint mount 14. This extension 5 is coupled with the shifting carriage 3. The shifting carriage 3 is connected with the automatic transmission of the motor vehicle via a cable 4. The mode of operation of the guide element 15, which moves in the central guide curve 12 here, can be recognized especially clearly in this section view. The guide element 15 comprises a hollow cylinder, in which a compression spring 13 is located. The compression spring 13 presses a pin 16 with a rounded head against the surface of the central guide curve 12. The central guide curve 12 has five bulges in FIG. 8. The pin 16 can snap into these bulges. The five bulges thus represent "stable equilibrium positions," which allow the guide element 15 and consequently the connected gearshift lever 2 to snap in in this position. Five possible shift positions in the automatic transmission can be associated with these five positions.

On the whole, the present invention consequently provides a shifting device with an additional gate (tapping gate) for transmitting shift commands to an automatic transmission of a motor vehicle, which has a substantially simpler design than the prior-art shifting devices and can therefore be manufactured at a lower cost. At the same time, such a shifting device offers improved shifting comfort despite its simpler design.

While specific embodiments of the invention have been shown and described in detail to illustrate the application of the principles of the invention, it will be understood that the invention may be embodied otherwise without departing from such principles.

APPENDIX

LIST OF REFERENCE NUMBERS

APPENDIX

| List of Reference Numbers: | |
| --- | --- |
| 1 | Housing half |
| 2 | Gearshift lever |
| 3 | Shifting carriage |
| 3.1 | Guide lug of shifting carriage |
| 3.2 | Guide groove in housing |
| 4 | Cable |
| 5 | Extension of gearshift lever |
| 6 | Locking lever |
| 7 | Hook of locking lever |
| 7a | Catch for the hook of the locking lever at the housing |
| 8 | Release lever |
| 9 | Hook of release lever |
| 9a | Catch for the hook of the release lever at the shifting carriage |
| 10 | Elongated hole |
| 11 | Opening in shifting carriage |
| 12 | Central guide curve |
| 12.1 | First lateral guide curve |
| 12.2 | Second lateral guide curve |
| 13 | Compression spring |
| 14 | Ball and socket joint mount |
| 15 | Guide element |
| 16 | Pin |
| 17 | Connection element between the release lever and the locking lever |

What is claimed is:

1. A shifting device for transmitting shift commands to an automatic transmission of a motor vehicle, the shifting device comprising:
    a support structure;
    a gearshift lever that is pivotable around a selector axis in selector directions and a shift axis in shift directions, wherein the selector axis and the shift axis are arranged substantially at right angles in relation to one another, the gearshift lever being shifted at least into one first shift gate and a second shift gate, wherein the first shift gate shifts shifting programs (P, N, R and D) of an automatic transmission and the second shift gate implements manual tapping commands;
    a shifting carriage mounted such that said shifting carriage can be moved linearly in a plane and is designed such that the movement of the gearshift lever in the first shift gate brings about a linear displacement of the shifting carriage due to a force coupling, and uncoupling of the movement of the gearshift lever from the shifting carriage is brought about by a movement of the gearshift lever in the second shift gate; and
    a locking element for fixing the shifting carriage, said locking element being actuated by the movement of the gearshift lever in one of said selector directions for fixing said shifting carriage as soon as said gearshift lever is in said second shift gate.

2. A shifting device in accordance with claim 1, wherein a coupling is provided between the shifting carriage and the automatic transmission.

3. A shifting device in accordance with claim 2, wherein the coupling comprises one of a set of mechanical link elements and a cable.

4. A shifting device in accordance with claim 2, wherein the coupling is embodied at least partly by electric elements.

5. A shifting device in accordance with claim 2, wherein the coupling is embodied at least partly by optical elements.

6. A shifting device in accordance with claim 1, wherein switches are arranged in the second shift gate to implement the shift commands.

7. A shifting device in accordance with claim 1, wherein the locking element has a hook and engages openings of the support structure.

8. A shifting device in accordance with claim 1, further comprising release means for releasing the shifting carriage to release the force coupling between the shifting carriage and the gearshift lever as soon as the gearshift lever is in the second shift gate.

9. A shifting device in accordance with claim 8, wherein the release means is a release lever mounted pivotably around an axis of the shifting carriage and displaceably around same and is locked with the shifting carriage in a first locked position and is displaceable in relation to the shifting carriage in a second position.

10. A shifting device in accordance with claim 1, wherein the shifting carriage has openings, which are engaged by the gearshift lever, and said openings are designed such that a relative movement between the gearshift lever and the shifting carriage is possible in the second shift gate and there is a force coupling of the movement between the gearshift lever and the shifting carriage in the first shift gate.

11. A shifting device in accordance with claim 1, wherein the gearshift lever is guided directly or indirectly in a guide curve in order to determine the shifting programs (P, N, R and D) of the automatic transmission and to produce an ergonomic feeling of shifting.

12. A shifting device in accordance with claim 1, wherein the gearshift lever is mounted by means of a ball and socket joint.

13. A shifting device in accordance with claim 1, wherein the gearshift lever is mounted with two axes arranged crosswise in relation to one another.

14. A shifting device in accordance with claim 1, wherein a third shift gate is provided, wherein two outer shift gates are preferably symmetrical to a middle shift gate.

15. A shifting device for transmitting shift commands of a motor vehicle, the shifting device comprising:
    a frame;
    a gearshift lever that it is pivotable around a selector axis and a shift axis with the gearshift lever being shifted at least into one first shift gate and a second shift gate;
    a shifting carriage mounted such that it can be moved linearly in a plane, said shift carriage being connected to said gearshift lever via a force coupling with the movement of the gearshift lever in the first shift gate bringing about a linear displacement of the shifting carriage and uncoupling of the movement of the gearshift lever from the shifting carriage is brought about by a movement of the gearshift lever in the second shift gate; and a locking element for fixing the shifting carriage, said locking element being actuated by the movement of the gearshift lever about said selector axis and with fixing of said shifting carriage occurring upon said gearshift lever being in said second shift gate allowing movement of said gearshift lever in said shift gate without movement of said shifting carriage.

16. A shifting device in accordance with claim 1, wherein said shifting carriage is fixable to said support structure by said locking element.

17. A shifting device in accordance with claim 16, wherein said locking element comprises a lever.

18. A shifting device in accordance with claim 17, wherein said locking element is pivotably arranged at said shifting carriage.

19. A shifting device in accordance with claim 18, wherein said gearshift lever has an extension extending through an opening in said locking element.

20. A shifting device in accordance with claim 19, wherein said extension engages said shifting carriage.

21. A shifting device in accordance with claim 20, wherein said locking element has a hook for snapping into a catch provided on said support structure.

22. A shifting device in accordance with claim 18, further comprising:

a release lever movably arranged at said shifting carriage, wherein said locking lever and said release lever are connected to one another.

23. A shifting device in accordance with claim 22, wherein said release lever is connected with said gear shift lever.

24. A shifting device in accordance with claim 23, wherein said release lever can be fastened to a catch of said shifting carriage.

25. A shifting device in accordance with claim 24, wherein said locking element has a hook for engaging a catch provided on said housing.

26. A shifting device for transmitting shift commands to an automatic transmission of a motor vehicle, the shifting device comprising:

a support structure;

a gearshift lever mounted to pivot around a selector axis and to pivot around a shift axis, said gearshift lever pivoting about said selector axis for moving between a first shift gate and a second shift and said gearshift lever pivoting about said shift axis to move in said first shift gate and to move in said second shift gate;

a shifting carriage mounted exclusively for linearly movement in a plane and being directly coupled to said gearshift lever or a part moving with said gearshift lever with said gearshift lever in said first shift gate and said shifting carriage not being coupled to said gearshift lever or a part moving with said gearshift lever with said gear shift lever in said second shift gate whereby said gearshift lever or a part moving with said gearshift lever in said first shift gate brings about a linear displacement of the shifting carriage due to a force coupling and and uncoupling of the movement of said gearshift lever relative to said shifting carriage is brought about by a movement of the gearshift lever in the second shift gate.

* * * * *

UNITED STATES PATENT AND TRADEMARK OFFICE
CERTIFICATE OF CORRECTION

PATENT NO. : 7,137,313 B2  
APPLICATION NO. : 11/060676  
DATED : November 21, 2006  
INVENTOR(S) : Giefer et al.

It is certified that error appears in the above-identified patent and that said Letters Patent is hereby corrected as shown below:

On title Page (73), replace with the following:  
(73) Assignee: ZF Lemförder Metallwaren AG (DE)

Signed and Sealed this

Twenty-second Day of May, 2007

JON W. DUDAS  
*Director of the United States Patent and Trademark Office*